United States Patent [19]
Cirigliano et al.

[11] Patent Number: 6,022,576
[45] Date of Patent: Feb. 8, 2000

[54] FLAVORING MATERIALS FOR USE IN TEA CONTAINING BEVERAGES

[75] Inventors: Michael Charles Cirigliano, Cresskill; Francis John Farrell, Madison; Raymond Thomas McKenna, Scotch Plains; Paul John Rothenberg, New Milford, all of N.J.

[73] Assignee: Lipton, Division of Conopco, Inc., Englewood Cliffs, N.J.

[21] Appl. No.: 08/958,959

[22] Filed: Oct. 28, 1997

[51] Int. Cl.$^7$ .................................. A23L 2/00; A23F 3/00
[52] U.S. Cl. ...................... 426/597; 426/330.3; 426/335; 426/331; 426/654; 426/650; 426/538
[58] Field of Search ................. 426/330.3, 335, 426/331, 597, 654, 650, 538

[56] References Cited

U.S. PATENT DOCUMENTS

| | | | |
|---|---|---|---|
| 4,567,056 | 1/1986 | Schmidt | 426/607 |
| 4,748,033 | 5/1988 | Syfert et al. | 426/330.3 |
| 5,008,441 | 4/1991 | Nakanishi et al. | 560/75 |
| 5,336,513 | 8/1994 | Reimer | 426/548 |
| 5,431,940 | 7/1995 | Calderas | 426/330.3 |

FOREIGN PATENT DOCUMENTS

| | | |
|---|---|---|
| 0 144 417 | 8/1988 | European Pat. Off. . |
| 57-194775 | 11/1982 | Japan . |
| 97/21359 | 6/1997 | WIPO . |
| 97/30597 | 8/1997 | WIPO . |

OTHER PUBLICATIONS

International Search Report in the application of PCT/EP 98/06637.
Patent Abstracts of Japan JP 04 027374 published Jan. 30, 1992.
Horvat et al., "A gas–liquid chromatographic Method for Analysis ofPhenolic Acids in Plants", Journal of Agricultural Foods and Chemistry, vol. 28, pp. 1292–1295, 1980.
Patent Abstracts of Japan JP 61 195646 published Jan. 17, 1987.
Database WIP abstract of CN 1 008 739 published Jul. 6, 1994.
Patent Abstracts of Japan JP 07 194356 published Aug. 1, 1995.
Taylor, R. J., *Foods Additives,* John Wiley & Sons, pp. 44–49, (1980).
*Food Chemicals Codex,* National Academy Press, pp. 354–418, (1981).
Branen et al., *Food Additives,* Marcel Dekker, Inc., pp. 213–225, (1990).
Furia, Thomas E., *Handbook of Food Additives,* CRC Press, pp. 271–276, (1968).
Woodbine, M., *Antibiotics and Antibiosis in Agriculture,* Butterworths, pp. 103–130, (1977).
Derwent abstract of DE 44 34 314.
Abstract of JP 08 066 171.
Abstract of JP 59 015 477.
Abstract of JP 56 021 557.
Derwent abstract of JP 49 015 788.
Derwent abstract of CN 1081578.

*Primary Examiner*—Anthony J. Weier
*Attorney, Agent, or Firm*—James J. Farrell

[57] ABSTRACT

An aqueous based tea solids containing beverage is taught which also contains a sufficient amount of a selected substituted phenyl flavoring/antimicrobial compound to prevent microbial outgrowth while simultaneously contributing to the pleasant flavor of the beverage thus making the beverage acceptable both organoleptically and microbiologically. Optionally selected "hurdles" or stepwise antimicrobial controls are also employed.

16 Claims, No Drawings

FLAVORING MATERIALS FOR USE IN TEA CONTAINING BEVERAGES

BACKGROUND OF THE INVENTION

Field of the Invention

The present invention relates to the use of natural and synthetically prepared flavorant materials which also act as antimicrobials in aqueous based beverages containing tea solids. These materials are selected substituted phenyl compounds.

BRIEF DESCRIPTION OF THE INVENTION

Acidified and native pH ready-to-drink (RTD) tea beverages, in the 2.5–6.5 pH range regardless of packaging are known to be susceptible to spoilage. As compared to cans, tea beverages packaged in glass and plastic bottles (because of increased $O_2$ ingress), as well as tea beverages at the higher range of the pH spectrum, are even more sensitive to yeast and mold spoilage than canned teas.

There are many different processes for preparing and packaging or bottling ready-to-drink (RTD) teas. For example, in one process the bottles can all be sterilized and the tea beverage first pasteurized and then bottled at high temperature. Each of these high temperature treatments requires a large capital investment for equipment and if there were many different bottling plants the costs of equipping each of these multiple plants with such high temperature equipment would be prohibitive if not impossible to justify.

Further all of these high temperature expedients are relatively inefficient and require a very high use of energy and excessive costs in addition to the original equipment costs. It is thus seen to be desirable to be able to prepare and bottle RTD teas without using such cost ineffective, energy intensive methods which also require a large initial investment in equipment.

This is particularly significant if bottling is scheduled to take place in a large number of pre-existing bottling plants.

In an effort to overcome these problems a stepwise approach was taken. The principal requirement was to produce an excellent flavored tea beverage which is microbiologically acceptable and which can be shipped and stored in a normal distribution chain through various warehouses and retail consumer outlets. These requirements must be met while keeping costs to a reasonable level and using pre-existing bottling plants. This in turn necessitates minimizing capital investment in specialized equipment such as high temperature sterilizing and pasteurizing equipment and water treatment equipment such as reverse osmosis (RO) equipment.

Studies revealed that all of the above conditions could be satisfied by initiating a series of "hurdles" or steps each of which was designed to use existing equipment and resources. This could be accomplished within a reasonable cost while improving the microbiological stability of the tea beverage without deleteriously affecting its delicate flavor.

The steps include employing water having a very low water hardness; using a pH of about 2.5 to 4.0; using selected sequestrants with the pH and water adjustments; using selected polyphosphates in combination with the pH water and sequestrants; and using selected well known preservatives such as nisin, natamycin, sorbic acid and sorbates and benzoic acid and benzoates together with the low water hardness, the pH adjustment, sequestrants and polyphosphates. Together these steps contribute to the antimicrobial effect and thus individually each is incrementally antimicrobially effective.

Each of these steps produces at least incremental and frequently synergistic antimicrobial effects. None of them however contribute positively to the overall delicate flavor of the tea beverage, rather all of the steps taken are done to improve microbiological stability without negatively affecting the flavor. Thus, the incrementally antimicrobially effective amount must take into account the flavor profile of the tea.

Many preservatives are readily available for many diverse uses. However natural compounds which are primarily flavorants are not usually considered for their antimicrobial activity.

There have been some attempts to use selected natural materials as preservatives. One of them is illustrated in Japanese Patent application 57/194,775 where cinnamic acid is used in combination with selected other organic acids including citric acid and sorbic acid.

U.S. Pat. No. 5,431,940 takes the approach of stabilizing beverages by using water having a low degree of hardness in combination with other preservatives and polyphosphates. The alkalinity is specified.

Tea containing beverages, because of their delicate balance of flavors require the utmost care in selecting preservatives. A fine balance must be achieved in stabilizing teas without deleteriously affecting their flavor. Thus it is desirable to employ a natural compound as a flavorant which also may serve as an antimicrobial.

A method and composition is disclosed for imparting a pleasant flavor to tea beverages while simultaneously contributing to the control of microbial growth in ready-to-drink still and carbonated tea beverages, for distribution and sale at ambient or chilled temperatures. In addition a method and composition incorporating a stepwise or "hurdle" approach described above is disclosed. The beverages include herbal teas, both "still" and carbonated as well as black, oolong and green tea. The method uses selected compounds in optional combination with the hurdle or step approach. These natural compounds may be obtained naturally or synthesized.

The method, which also contributes to the stability of tea beverages employs a class of chemical compounds characterized by a structure containing an aromatic base, preferably an aromatic acid such as phenylbutenoic or phenylhexenoic acid and selected derivatives.

Generally the aromatic based compounds are as follows:

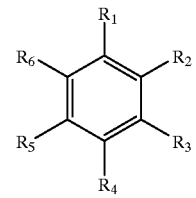

wherein $R_1$ is an unsaturated, non-halogenated side chain having up to about 9 carbons, one of which is preferably a carboxyl group, which may or may not be esterified, and the side chain has at least one double bond. The $R_1$ side chain preferably has up to about 6 carbon atoms. The $R_1$ side chain may contain unsaturated molecular components from the ester, alcohol, ketone or acid families. The compounds contain, as well, additional $R_{2-6}$ groups occupying the other sites on the benzene ring where $R_{2-6}$ may be the same or different and may be hydrogen or a low molecular weight non-halogenated neutral or electronegative group such as O, COOH, OH, $OCH_3OC_2H_5$, $CH_3$ and $C_2H_5$ among others but at least one of $R_{2-6}$ must be a low molecular weight group. Examples of such compounds include the naturally occurring sinapic, caffeic, coumaric, chlorogenic and ferulic acids as well as eugenol, and anethole among others. These compounds, impart pleasant or unique desirable and distinctive flavor to tea beverages when properly combined. These also contribute to the stability of the beverage and may be used alone or in combination with mild heat treatments or reduced levels of traditional chemical preservatives such as sorbic and/or benzoic acid and their salts. They also contribute to antimicrobial activity at both ambient and chilled temperatures.

As mentioned above acidified and native pH based tea beverages including juice flavored and juice containing tea beverages in the 2.5–7.0 pH range are known to be susceptible to spoilage by yeast, mold, acid tolerant bacteria (e.g. Lactobacillus sp, Gluconobacter/Acetobacter sp.) and/or mesophilic or thermophilic spore forming (e.g. *B. coagulans* and the Alicyclobacillus sp.) and non-spore forming bacteria. The compounds of the invention such as 3,4-dihydroxycinnamic acids (i.e. caffeic acid), 4-hydroxy-3-methoxycinnamic acid (i.e. ferulic acid) and 3-caffeoylquinic acid (i.e. chlorogenic acid) alone, when formulated in combination with low levels of sorbic or benzoic acid and mixtures of these as well as other flavor components contribute to a pleasant unique, desirable and distinctive flavored tea while adding the benefit of their antimicrobial activity. The compounds may be used at individual concentrations of preferably from about 25 to about 600 ppm and while used primarily as a flavorant have been found to be extremely effective antimicrobials. The compounds are effective against yeast, mold, and other acid tolerant and non-acid tolerant spore-forming and non-spore-forming spoilage bacteria in ready-to-drink tea beverages and tea beverages containing juice, fruit or vegetable extracts and/or additional flavors.

Higher levels of the compounds of the invention up to about 2,000 ppm or higher may be used if desired.

The increased efficacy of these compounds as antimicrobials, relative to a simple phenolic acid like benzoic acid, is believed to be attributable to the presence of an unsaturated side chain. The efficacy of this side chain increases with the length of the side chain and the number of reactive double bonds contained in the same. The presence of these double bonds enhances the reactivity of the compound, internal to the microbial cell, after passive transport of the compound into the cell. This is similar to the transport of benzoic acid into the cell. The subsequent combination effects of the dissociation of the acid moiety internal to the cell, and the accompanying presence of one or more highly reactive double bonds, contributes significantly to the antimicrobial effect observed. Small chemical groups that release, or by virtue of their bonding structure, readily share electrons significantly stabilize the benzene ring's electrical charge and reduce the amount of energy needed to force reactions to take place at other sites on the ring. Relatively small electron withdrawing groups at other sites on the ring destabilize it and are therefore more easily released as highly reactive charged species or free radicals. The combination of these electron releasing and electron withdrawing species on the same ring provides unique reactive properties.

The small size of the attached groups facilitates passage through the cell membrane and concentrates the energy of reaction once inside the cell. These combinations include H, OH, $CH_3$, $NH_2$, $OCH_3$ as "activating" (electron releasing) groups, and COOH, $COCH_3$, CHO, $NO_2$ alone or attached to short unsaturated carbon chains, as electron withdrawing groups that become released as highly reactive charged or free radical species.

The use of the disclosed class of compounds, both naturally derived and synthetically prepared, provides a portfolio of antimicrobial compounds that may be used to formulate beverages which are "all-natural", by the current definition of the term. Pleasantly flavored, ready-to-drink still and carbonated tea beverages that are stable and safe at ambient temperatures and/or that have an extended shelf life at chill temperatures are thus enabled. Further, the flexibility of the class of compounds affords a broad selection of agents suited to complement enhance and/or contribute of unique, desirable and distinctive flavor to the flavor profile of the tea beverage system.

Some specific examples of the compounds are as follows:

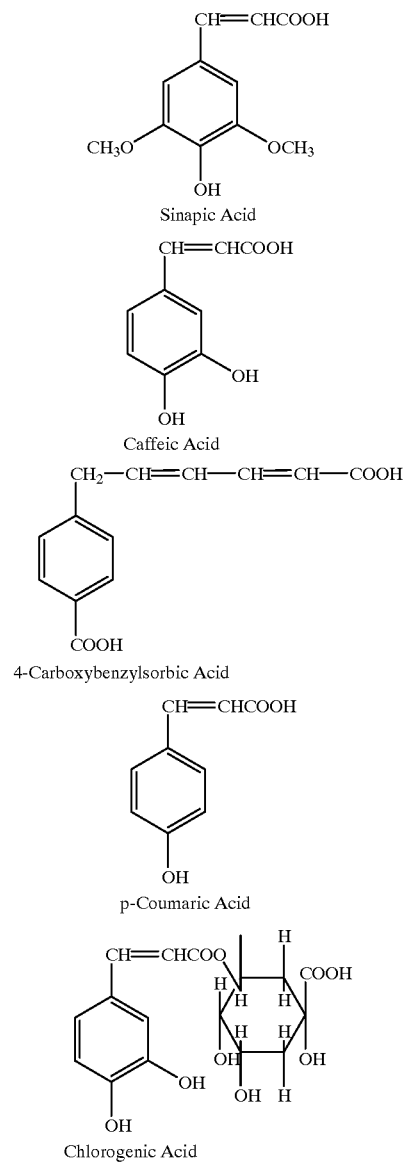

-continued

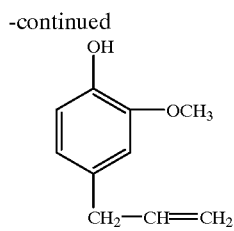
Eugenol

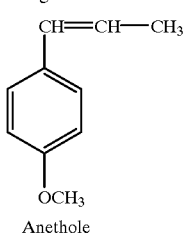
Anethole

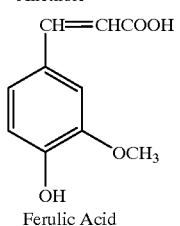
Ferulic Acid

While not wishing to be bound thereby, it is theorized that the antimicrobial material operates as follows: Essentially the organism will typically passively transport the compound class described, in its non-dissociated (uncharged) state. Once the compound is in the cell it begins to dissociate, essentially upsetting the pH balance internal to the cell. An organism such as Z. bailii, one of the yeast species that poses a serious spoilage problem in beverages is reported to possess an ability to pump a preservative such as benzoic acid out quite readily thus, leading to Z. bailii's reputation as being somewhat preservative resistant. The compounds of the present invention are less likely to succumb to the preservative pump because of added high reactivity of the unsaturated side chain. It is believed that for this reason compounds of the type disclosed are effective.

In addition to the selected flavorant for tea beverages it is advantageous to lower the pH to about 2.5 to 4.0 to improve the beverage stability. This is particularly useful when fruit juices or fruit flavors are employed in ready to drink tea beverages such as lemon flavored tea beverages.

Further it has been found that the flavorant/antimicrobial compounds of the invention provide improved stability in tea beverages when the magnesium and calcium ions common to tap water are kept to a minimum of no more than about 300 ppm as $CaCO_3$. Preferably the hardness is less than about 100 ppm and most preferably less than about 50 ppm or even lower such as 25 ppm or less. This can be achieved by deionization reverse osmosis or ion exchange in appropriate manner.

In addition it has been found that selected phosphates also contribute to stability and flavor and thus about 100 ppm to about 1000 ppm or higher and preferably about 250 to 500 ppm of a polyphosphate having the formula:

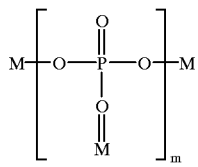

where m averages about 3 to 100 and M may be sodium or potassium.

Other preservatives such as sorbic acid or sorbate and benzoic acid or benzoates or parabens used alone or in combination at levels of about 50 to 1000 ppm provide a benefit without effecting flavor.

Additional sequestrants such as EDTA, NTA and the like have also been found to be useful in amounts of about 20 ppm up to about 1000 ppm and preferably about 30 ppm to about 1000 ppm. When EDTA is used the lower levels are preferred. Many suitable sequestrants are listed in the Handbook of Food Additives, 2nd Edition, edited by Furia, CRC Press.

As used herein, the term "tea concentrate" refers to a product derived from concentrated tea extract which is diluted with water to form a drinkable tea beverage. The method of extraction is not significant and any method known in the art may be used.

As used herein, the term "tea beverage" refers to a drinkable beverage prepared from tea concentrates, extracts or powder. Usually the beverage is prepared by mixing with water. Various other flavoring agents and/or juices may also be included in the tea beverage such as fruit juices, vegetable juices and the like. If a concentrate or powder is used then the concentrate or powder is generally diluted with sufficient water to provide the tea beverage. Preferred tea concentrates or powders are typically diluted to about 0.06 to 0.4% tea solids and preferably about 0.08 to 0.2% tea solids to provide a drinkable tea beverage but this depends on the flavor profile sought and amounts of 0.01 to 0.5% or higher may be used.

As used herein, the term "tea solids" refers to those solids normally present in a tea extract including normal tea antioxidants. Polyphenolic compounds are normally the primary component of tea solids when prepared from an extract of Camellia sinensis. However, tea solids can also include caffeine, proteins, amino acids, minerals and carbohydrates.

All parts and proportions herein and the appended claims are by weight unless otherwise indicated.

In order to demonstrate a stepwise or "hurdle" approach to achieving microbiological stability, several sets of experiments were run to establish the benefit of employing this approach. The individual steps are as follows:

1. water with a low water hardness;
2. pH control;
3. sequestrants including EDTA;
4. polyphosphate;
5. benzoate;
6. sorbate;
7. the compounds of the invention.

A ready to drink (RTD) tea composition containing about 0.08% tea solids was prepared having the following general composition.

| | |
|---|---|
| K Sorbate | .04% |
| K Benzoate | .03% |
| Citric Acid | .07% |
| Tea Powder | .08% |
| Color Component | .06% |
| Lemon Flavor | .1% |
| HFCS (High Fructose Corn Syrup 55DE) | 12.% |
| Water balance to | 100.% | pH adjusted to 2.8 with phosphoric acid.

EXAMPLE 1

Water hardness measured as $Ca(CO_3)$ in the presence and absence of 30 ppm of EDTA was studied at different water hardness levels including 28 ppm; 36 ppm; 72 ppm and 138 ppm.

The RTD beverage was prepared as above at several water hardness levels and inoculated with *Z bailii,* preservative resistant spoilage yeast at a level of 10 colony forming units (CFU) per ml of beverage. The beverage was then bottled and observed for failure such as a plate count with at least a 2 log increase; or "Frank Spoilage" such as for example $CO_2$ production or sediment or the like. Tabular results follows:

TABLE 1

Cumulative percent of bottles that have failed 28 ppm water hardness

| | with EDTA | | | | | without EDTA | | | | |
|---|---|---|---|---|---|---|---|---|---|---|
| weeks | 1 | 5 | 8 | 13 | 16 | 1 | 5 | 8 | 13 | 16 |
| % | 0 | 0 | 0 | 0 | 0 | 0 | 0 | 0 | 0 | 0 |

TABLE 2

Cumulative percent of bottles that have failed 36 ppm water hardness

| | with EDTA | | | | | without EDTA | | | | |
|---|---|---|---|---|---|---|---|---|---|---|
| weeks | 1 | 5 | 8 | 13 | 16 | 1 | 5 | 8 | 13 | 16 |
| % | 0 | 0 | 0 | 0 | 3 | 0 | 0 | 0 | 0 | 5 |

TABLE 3

Cumulative percent of bottles that have failed 72 ppm water hardness

| | with EDTA | | | | | without EDTA | | | | |
|---|---|---|---|---|---|---|---|---|---|---|
| weeks | 1 | 5 | 8 | 13 | 16 | 1 | 5 | 8 | 13 | 16 |
| % | 0 | 0 | 0 | 3 | 3 | 0 | 0 | 0 | 100 | — |

TABLE 4

Cumulative percent of bottles that have failed 138 ppm water hardness

| | with EDTA | | | | | without EDTA | | | | |
|---|---|---|---|---|---|---|---|---|---|---|
| weeks | 1 | 5 | 8 | 13 | 16 | 1 | 5 | 8 | 13 | 16 |
| % | 0 | 11 | 73 | 83 | 87 | 0 | 100 | — | — | — |

These results clearly show that increasing water hardness reduces the microbial stability of the beverages and the addition of EDTA increases the microbial stability of the beverages. The addition of EDTA has been reported to destabilize the microbial cell wall and cell membrane. Accordingly, EDTA is theorized to have the effect of contributing to stability of the beverage by reducing water hardness, chelating metals and increasing the permeability of the microbial cell wall to preservatives by destabilizing the wall and membrane.

EXAMPLE 2

A study was done to determine the impact of hexametaphosphate at a level of about 500 ppm at a pH of 2.8 and 3.2. An RTD beverage was prepared and bottled as in Example 1 except it contained 30 ppm EDTA and the water hardness was 50 ppm. The beverage was inoculated with *Z bailii* at 1 CFU and 10 CFU. Hexametaphosphate was either present or absent.

TABLE 5 pH 2.8 - 1 CFU - Cumulative % Failures

| weeks | 2 | 4 | 6 | 8 | 10 |
|---|---|---|---|---|---|
| sodium hexametaphosphate 0 ppm | 8 | 100 | — | — | — |
| sodium hexametaphosphate 500 ppm | 0 | 0 | 3 | 84 | 100 |

TABLE 6 pH 2.8 - 10 CFU - Cumulative % Failures

| weeks | 2 | 4 | 6 | 8 | 10 |
|---|---|---|---|---|---|
| sodium hexametaphosphate 0 ppm | 47 | 100 | — | — | — |
| sodium hexametaphosphate 500 ppm | 0 | 0 | 100 | — | — |

TABLE 7 pH 3.2 - 1 CFU - Cumulative % Failures

| weeks | 1 | 2 | 3 | 4 | 6 | 8 | 10 |
|---|---|---|---|---|---|---|---|
| sodium hexametaphosphate 0 ppm | 0 | 0 | 89 | 100 | — | — | — |
| sodium hexametaphosphate 500 ppm | 0 | 0 | 3 | 100 | — | — | — |

TABLE 8

| pH 3.2 - 10 CFU - Cumulative % Failures | | | | | | | |
|---|---|---|---|---|---|---|---|
| weeks | 1 | 2 | 3 | 4 | 6 | 8 | 10 |
| sodium hexametaphosphate 0 ppm | 0 | 39 | 100 | — | — | — | — |
| sodium hexametaphosphate 500 ppm | 0 | 0 | 100 | — | — | — | — |

The results clearly show the enhancement in the delay of the onset of spoilage by the use of hexametaphosphate. Additionally this reinforces that lower pH contributes to the microbial stability of the beverage.

EXAMPLE 3

A study examined the effect of pH at 2.8 and 3.1 in the presence and/or absence of benzoic and sorbic acids. The RTD beverage was prepared as in Example 1 except that 30 ppm of EDTA was added, the amount and presence of sorbic acid and benzoic acid was varied and the water hardness was set at 50 ppm. The inoculum used was 1 CFU/ml beverage of *Z bailii* preservative resistant yeast:

Tabular results follow:

TABLE 9

| Benzoic acid - 0 ppm  Sorbic acid 200 ppm | | | | | | |
|---|---|---|---|---|---|---|
| Cumulative % of Failures weeks | 2 | 4 | 6 | 8 | 10 | 12 |
| pH 3.1 | | | | | | |
| % | 0 | 11 | 43 | 54 | 54 | 62 |
| pH 2.8 | | | | | | |
| % | 0 | 0 | 0 | 0 | 3 | 3 |

TABLE 10

| Benzoic acid - 200 ppm  Sorbic acid 0 ppm | | | | | | |
|---|---|---|---|---|---|---|
| Cumulative % of Failures weeks | 2 | 4 | 6 | 8 | 10 | 12 |
| pH 3.1 | | | | | | |
| % | 0 | 44 | 92 | 92 | 92 | 94 |
| pH 2.8 | | | | | | |
| % | 0 | 0 | 8 | 11 | 14 | 14 |

TABLE 11

| Benzoic acid - 100 ppm  Sorbic acid 100 ppm | | | | | | |
|---|---|---|---|---|---|---|
| Cumulative % of Failures weeks | 2 | 4 | 6 | 8 | 10 | 12 |
| pH 3.1 | | | | | | |
| % | 0 | 3 | 8 | 14 | 14 | 14 |

TABLE 11-continued

| Benzoic acid - 100 ppm  Sorbic acid 100 ppm | | | | | | |
|---|---|---|---|---|---|---|
| Cumulative % of Failures weeks | 2 | 4 | 6 | 8 | 10 | 12 |
| pH 2.8 | | | | | | |
| % | 0 | 0 | 0 | 0 | 0 | 0 |

These results demonstrate the synergistic effect of the combination of sorbic acid benzoic acid as well as the effect of lower pH on microbial stability of the beverage.

EXAMPLE 4

A study was run to screen for the effect of the compounds of the invention on microbial stability in a tea beverage.

The tea beverage was prepared from tea extracted with hot water and containing about 0.12% tea solids. The tea extract was sweetened with high fructose corn syrup and flavored with lemon flavor and citric acid to form the beverage. The pH was 2.8. A sorbate/benzoate control (Control A) was prepared from the above beverage by adding 200 ppm benzoic acid and 300 ppm sorbic acid. An unpreserved control (control B), prepared from the same beverage but having no sorbate or benzoate was also included.

In addition to the controls four test formulations were prepared by adding to the above beverage test compounds as follows:

| | |
|---|---|
| 1. ferulic acid | 200 ppm. |
| 2. coumaric acid | 200 ppm. |
| 3. sinapic acid | 200 ppm. |
| 4. caffeic acid | 220 ppm. |

The tests were run in triplicate in 10 ml. culture tubes. Each tube was inoculated with 1 CFU/ml of beverage of *Z bailii* preservative resistant yeast. The results are reported as follows:

TABLE 12

| Days to Obvious "Frank Spoilage" i.e., Gassing | | | | | | | | | |
|---|---|---|---|---|---|---|---|---|---|
| weeks | 1 | 2 | 3 | 4 | 5 | 6 | 7 | 8 | 9 |
| Control A | 0/3 | 0/3 | 0/3 | 0/3 | 0/3 | 0/3 | 1/3 | 1/3 | 2/3 |
| Control B | 0/3 | 0/3 | 0/3 | 0/3 | 0/3 | 3/3 | 3/3 | 3/3 | 3/3 |
| Ferulic acid | 0/3 | 0/3 | 0/3 | 0/3 | 0/3 | 0/3 | 0/3 | 0/3 | 1/3 |
| Coumaric acid | 0/3 | 0/3 | 0/3 | 0/3 | 0/3 | 0/3 | 1/3 | 2/3 | 3/3 |
| Sinapic acid | 0/3 | 0/3 | 0/3 | 0/3 | 0/3 | 0/3 | 0/3 | 0/3 | 0/3 |
| Caffeic acid | 0/3 | 0/3 | 0/3 | 0/3 | 1/3 | 1/3 | 2/3 | 3/3 | 3/3 |

These results show that the compounds of the invention convey an antimicrobial effect in a tea beverage. the effect is comparable to and in a few cases better than the benzoic/sorbic acid combination.

The compounds could be ranked relative to the benzoic acid/sorbic acid system. For example coumaric acid began gassing the same day as the benzoic/sorbic system which would give a coefficient of 1. Ferulic acid would have a coefficient of about 1.3.

EXAMPLE 5

A study was run to more precisely define the inhibitory effects of one of the flavoring components from Example 4.

This study contained a tea beverage model containing the following components.

| | Approximate % |
|---|---|
| Yeast nitrogen broth base medium | 0.6 |
| fructose | 4.7% |
| glucose | 3.9 |
| citric acid | .7 |
| K benzoate | .03 |
| K sorbate | .04 |
| 40% phosphoric acid | .15 |
| sodium hexametaphosphate | .05 |
| water - Reverse Osmosis < 7 ppm hardness - balance to | 100% |
| pH to | 2.8 |

The study was run on a Lab Systems Bioscreen C. The model, both preserved and unpreserved, was used as a control, and caffeic acid was added to establish an antimicrobial effect. The cells were inoculated with 1000 CFU/ml of *Z bailii* and the samples were run in triplicate. The results are based on time to turbidity detection for each replicate and are tabulated as follows:

TABLE 13

Time to Turbidity Detection for Each Replicate

| | |
|---|---|
| Control Preserved | 68–75–83 hours |
| Control unpreserved | 19–19–20 hours |
| Caffeic acid 500 ppm | 80–98–99 hours |
| Caffeic acid 1000 ppm | No turbidity detected in 3 replicates; 168 hours |
| Caffeic acid 1500 ppm | No turbidity in 1 replicate; 79–89 hours |
| Caffeic acid 2000 ppm | 82–88–97 hours |

This clearly shows improved microbiological stability by using caffeic acid.

Although the invention has been described with respect to preferred embodiments thereof, variations and modifications will be readily apparent to those skilled in the art without departing from the spirit and scope of the invention as set forth in the claims.

What is claimed is:

1. A tea beverage containing a non-halogenated flavoring/antimicrobial compound of the formula:

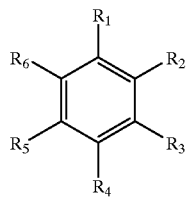

wherein said $R_1$ is a moiety having up to nine carbon atoms and at least 1 double bond;

wherein said $R_{2-6}$ groups may independently be H or a low molecular weight non-halogenated neutral or electron releasing group and at least one of said $R_{2-6}$ groups is a low molecular weight non-halogenated neutral or electron releasing group, said compound being present in the beverage in an antimicrobial effective amount and said compound being capable of having a selective flavoring effect on said foodstuff.

2. An aqueous based beverage comprising about 0.02% to 0.5% tea solids by weight and a sufficient amount of the compound of claim 1 to prevent microbial spoilage.

3. A beverage as defined in claim 2 wherein said compound is present in an amount of about 20 to 2000 ppm.

4. A beverage as defined in claim 2 having sufficient amount of said compound to completely inhibit the outgrowth of yeast, mold and other microbes.

5. A beverage as defined in claim 2 further comprising sufficient tea solids to result in a antioxidant effect.

6. A beverage as defined in claim 2 further comprising a flavoring agent or fruit or vegetable juice or extract in addition to tea.

7. A beverage as defined in claim 1 having a pH of 2.5 to 4.5.

8. A beverage as defined in claim 1 prepared from water having a total water hardness measured as $Ca(CO_3)$ of no greater than 50 ppm.

9. A beverage as defined in claim 1 having about 20 ppm to about 1000 ppm of a sequestrant other than citric acid.

10. A beverage as defined in claim 1 having about 100 ppm to about 1,000 ppm of a polyphosphate.

11. A beverage as described in claim 1 having about 50 to 1000 ppm of a preservative selected from the group consisting of sorbic acid, sorbates, benzoic acid, benzoates, parabens and mixtures thereof.

12. A beverage as defined in claim 1 wherein said flavoring/antimicrobial compound is natural.

13. A beverage as defined in claim 1 wherein said flavoring/antimicrobial compound is synthetic.

14. A method for flavoring/preserving a tea beverage comprising adding to said beverage an antimicrobiologically effective amount of a compound of the formula

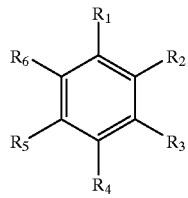

wherein said $R_1$ is a moiety having up to nine carbon atoms and at least 1 double bond;

wherein said $R_{2-6}$ groups may independently be H or a low molecular weight non-halogenated neutral or electron releasing group and at least one of said $R_{2-6}$ groups is a low molecular weight non-halogenated neutral or electron releasing group, said compound being present in the beverage in an antimicrobial effective amount and said compound being capable of having a selective flavoring effect on said foodstuff.

15. A method for improving the microbiological stability of a tea beverage comprising controlling water hardness of said beverage to an antimicrobial level;

controlling the pH of said beverage to an antimicrobial level;

adding an incrementally antimicrobial effective amount of polyphosphate to said beverage;

adding an incrementally antimicrobial effective amount of a sequestrant other than polyphosphate to said beverage;

adding an incrementally antimicrobial effective amount of benzoic acid or benzoate to said beverage;

adding an incrementally antimicrobial effective amount of sorbic acid or sorbate to said beverage;

adding to said beverage an incrementally antimicrobial effective amount of a compound of the formula:

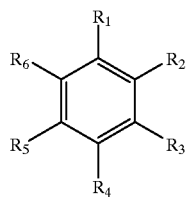

wherein said $R_1$ is a moiety having up to nine carbon atoms and at least 1 double bond;

wherein said $R_{2-6}$ groups may independently be H or a low molecular weight non-halogenated neutral or electron releasing group and at least one of said $R_{2-6}$ groups is a low molecular weight non-halogenated neutral or electron releasing group and said compound being capable of having a selective flavoring effect on said foodstuff.

16. A tea beverage having a water hardness of about 25 ppm to 100 ppm measured as $CaCO_3$; a pH of less than about 3; about 200 to 700 ppm of sodium hexametaphosphate; about 10 to 75 ppm of EDTA; about 100 to 300 ppm of benzoic acid or benzoate; about 100 to 300 ppm of sorbic acid or sorbate; and about 10 to 1000 ppm of a compound of the formula:

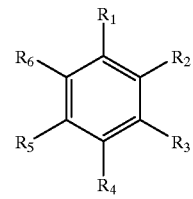

wherein said $R_1$ is a moiety having up to nine carbon atoms and at least 1 double bond;

wherein said $R_{2-6}$ groups may independently be H or a low molecular weight non-halogenated neutral or electron releasing group and at least one of said $R_{2-6}$ groups is a low molecular weight non-halogenated neutral or electron releasing group, said compound being capable of having a selective flavoring effect on said foodstuff.

* * * * *